(12) United States Patent
Peng et al.

(10) Patent No.: US 11,709,411 B2
(45) Date of Patent: Jul. 25, 2023

(54) DISPLAY WITH IMAGE LIGHT STEERING

(71) Applicant: META PLATFORMS TECHNOLOGIES, LLC, Menlo Park, CA (US)

(72) Inventors: Fenglin Peng, Redmond, WA (US); Ying Geng, Bellevue, WA (US); Jacques Gollier, Sammamish, WA (US); Giuseppe Calafiore, Redmond, WA (US); Alexander Koshelev, Redmond, WA (US); Mengfei Wang, Seattle, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/378,467

(22) Filed: Jul. 16, 2021

(65) Prior Publication Data
US 2023/0017524 A1  Jan. 19, 2023

(51) Int. Cl.
| | |
|---|---|
| *G02F 1/29* | (2006.01) |
| *G02B 27/01* | (2006.01) |
| *G02F 1/13* | (2006.01) |
| *G02F 1/1347* | (2006.01) |
| *G06F 3/01* | (2006.01) |

(52) U.S. Cl.
CPC ......... *G02F 1/292* (2013.01); *G02B 27/0172* (2013.01); *G02B 27/0179* (2013.01); *G02F 1/1323* (2013.01); *G02F 1/13473* (2013.01); *G02B 2027/0178* (2013.01); *G02B 2027/0187* (2013.01); *G06F 3/013* (2013.01)

(58) Field of Classification Search
CPC .... G02F 1/292; G02F 1/1323; G02F 1/13473; G02B 27/0172; G02B 27/0179; G02B 2027/0178; G02B 2027/0187; G06F 3/013
See application file for complete search history.

(56) References Cited

U.S. PATENT DOCUMENTS

| | | |
|---|---|---|
| 8,558,853 B2 | 10/2013 | Sagardoyburu et al. |
| 10,054,732 B2 | 8/2018 | Robinson et al. |
| 10,062,357 B2 | 8/2018 | Woodgate et al. |
| 10,397,557 B2 | 8/2019 | Vdovin et al. |

(Continued)

FOREIGN PATENT DOCUMENTS

| | | |
|---|---|---|
| WO | 2021089138 | 5/2021 |
| WO | 2022066589 A2 | 3/2022 |

OTHER PUBLICATIONS

International Search Report and Written Opinion for International Application No. PCT/US2022/037194, dated Oct. 31, 2022, 14 pages.

*Primary Examiner* — Nathanael R Briggs
(74) *Attorney, Agent, or Firm* — Pequignot + Myers; Matthew A. Pequignot

(57) ABSTRACT

A display device includes a directional illuminator providing a light beam, a display panel downstream of a directional illuminator, for receiving and spatially modulating the light beam, and a beam redirecting module downstream of the display panel, for variably redirecting the spatially modulated light beam. Steering the illuminating light by the beam redirecting module enables one to steer the exit pupil of the display device to match the user's eye location(s).

18 Claims, 14 Drawing Sheets

(56) References Cited

U.S. PATENT DOCUMENTS

| | | |
|---|---|---|
| 10,678,116 B1* | 6/2020 | Lam ................. H04L 67/06 |
| 10,775,633 B1* | 9/2020 | Lee .................. G02B 27/0179 |
| 2020/0012117 A1* | 1/2020 | Woodgate ........... G02B 6/0035 |
| 2020/0081315 A1* | 3/2020 | Jamali ................ G02B 5/30 |
| 2020/0117009 A1 | 4/2020 | Chuang et al. |
| 2020/0294190 A1 | 9/2020 | Shin et al. |
| 2021/0199958 A1 | 7/2021 | Huang et al. |

* cited by examiner

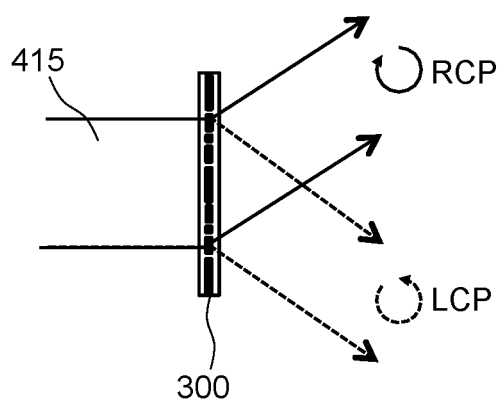
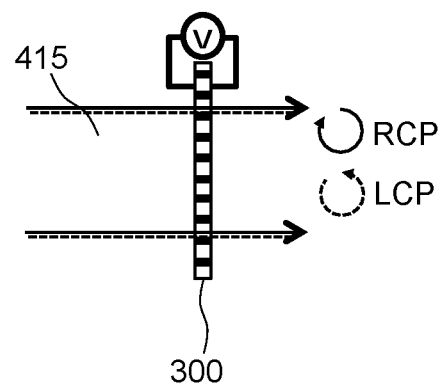
FIG. 4A
FIG. 4B

DISPLAY WITH IMAGE LIGHT STEERING

TECHNICAL FIELD

The present disclosure relates to optical devices, and in particular to visual displays and their components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED, e.g. in form of a headset or a pair of glasses, configured to present artificial reality content to a user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images or CGIs) and the surrounding environment by seeing through a combiner component. The combiner component of a wearable display is typically transparent to external light, but includes some light routing optic to direct the display light into the user's field of view.

Compact and energy-efficient display devices are desired for head-mounted display systems. Because a display of HMD/NED is usually worn on the head of a user, a large, bulky, unbalanced, and/or heavy display device with a heavy battery would be cumbersome and uncomfortable for the user to wear. Compact display devices require compact and energy-efficient light sources, image projectors, lightguides, focusing optics, and so on.

BRIEF DESCRIPTION OF THE DRAWINGS

Exemplary embodiments will now be described in conjunction with the drawings, in which:

FIGS. 4A and 4B are side schematic views of the active PBP LC grating of FIGS. 3A and 3B of the beam redirecting module of FIG. 1, showing light propagation in OFF (FIG. 4A) and ON (FIG. 4B) states of the active PBP LC grating;

DETAILED DESCRIPTION

Figure 1:
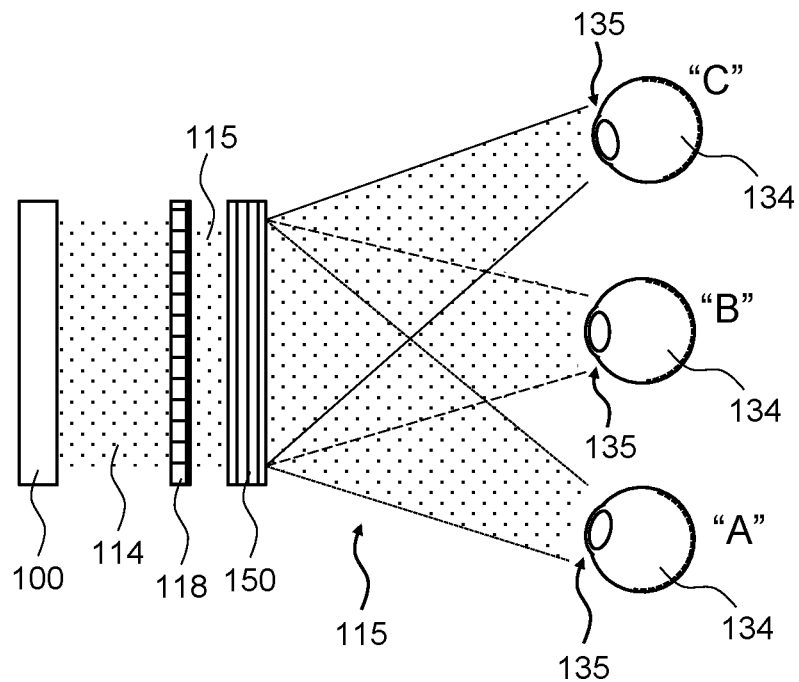
FIG. 1 is a schematic view of a near-eye display device of this disclosure.
Figure 1:
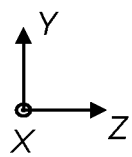

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2, 8-10, and 12, similar reference numerals denote similar elements.

A display device provides image light carrying an image for observation by a user. The image light may be spread over a large area including all possible locations of the display viewer(s). Spreading the image light over a broad area ensures that most of the light will be lost for the user. In accordance with this disclosure, the image light may be delivered specifically to the area of the user's eyes or even eye pupils, by causing the exit pupils of the display follow the eye pupils' position. To achieve the pupil steering function, a directional illuminator is used to illuminate a display panel. The display panel spatially modulates the illuminating light. The spatially modulated light is steered by a beam redirecting module disposed in an optical path downstream of the display panel. Such a configuration enables the image brightness improvement and/or energy savings due to not sending the image light to areas where it cannot be observed.

In accordance with the present disclosure, there is provided a display device comprising a directional illuminator for providing a light beam, a display panel downstream of the directional illuminator, for receiving and spatially modulating the light beam to provide a spatially modulated light beam carrying an image in linear domain, and a beam redirecting module downstream of the display panel, for variably redirecting the spatially modulated light beam. An ocular lens may be disposed downstream of the beam redirecting module, for forming an image in angular domain at an eyebox of the display device from the image in linear domain carried by the spatially modulated light beam and redirected by the beam redirecting module. An eye tracking system may be provided for determining a pupil position of a user's eye in the eyebox. A controller may be operably coupled to the eye tracking system and the beam redirecting module and configured to cause the beam redirecting module to redirect the spatially modulated light beam to match the eye pupil position in the eyebox. The directional illuminator may include at least one of a slab singlemode waveguide, a slab few-mode waveguide, or a pupil-replicating lightguide.

In some embodiments, the beam redirecting module comprises a stack of switchable gratings. Each switchable grating of the stack may be configured to redirect the spatially modulated light beam by a zero angle in a first state and a pre-determined non-zero angle in a second state. The pre-determined non-zero angles of different switchable gratings of the stack may be in a binary relationship to one another. The stack of switchable gratings may include e.g. a Pancharatnam-Berry phase (PBP) liquid crystal (LC) switchable grating. The stack of switchable gratings may further include a switchable polarization rotator disposed downstream of the PBP LC switchable grating, and a circular polarizer disposed downstream of the switchable polarization rotator.

In embodiments where the directional illuminator is configured for providing the light beam comprising light at first and second color channels, the PBP LC switchable gratings may include first and second PBP LC switchable gratings. The first PBP LC switchable grating may include a first LC layer having a first optical retardation substantially equal to an odd number of half wavelengths of the first color channel and an even number of half wavelengths of the second color channel. The second PBP LC switchable grating may include a second LC layer having a second optical retardation substantially equal to an odd number of half wavelengths of the second color channel and an even number of half wavelengths of the first color channel. More color channels may be provided. For example, the directional illuminator may be further configured for providing the light beam comprising light at a third color channel. The PBP LC switchable gratings may include a third PBP LC switchable grating comprising a third LC layer having a third optical retardation substantially equal to an odd number of half wavelengths of the third color channel, and an even number of half wavelengths of the first and second color channels.

In accordance with the present disclosure, there is provided a display device comprising a light source for providing a light beam, a pupil-replicating lightguide downstream of the light source, for expanding the light beam to provide an expanded light beam, a display panel downstream of the pupil-replicating lightguide, for receiving and spatially modulating the expanded light beam to provide a spatially modulated light beam carrying an image in linear domain, and a beam redirecting module downstream of the display panel, for variably redirecting the spatially modulated light beam. An ocular lens may be disposed downstream of the beam redirecting module, for forming an image in angular domain at an eyebox of the display device from the image in linear domain carried by the spatially modulated light beam. An eye tracking system may be provided for determining a display user's eye pupil position in the eyebox. A controller may be operably coupled to the eye tracking system and the beam redirecting module and configured to cause the beam redirecting module to redirect the spatially modulated light beam to match the eye pupil position in the eyebox. The beam redirecting module may include a stack of switchable gratings, e.g. PBP LC switchable gratings. The PBP LC switchable gratings may include an LC layer between parallel substrates configured for applying an electric field across the LC layer. LC molecules of the LC layer may be oriented substantially parallel to the substrates in absence of the electric field, and substantially perpendicular to the substrates in presence of the electric field.

In accordance with the present disclosure, there is further provided a method for displaying an image to a user. The method includes providing a light beam, receiving and spatially modulating the light beam to provide a spatially modulated light beam carrying an image in linear domain, and using a beam redirecting module to variably redirect the spatially modulated light beam towards an eye of the user. The method may include forming, by an ocular lens, an image in angular domain from the image in linear domain carried by the spatially modulated light beam and redirected by the beam redirecting module. The method may further include determining a display user's eye pupil position in an eyebox and causing the beam redirecting module to redirect the spatially modulated light beam to match the eye pupil position in the eyebox. Using the beam redirecting module may include switching at least one switchable grating of a stack of switchable gratings.

An illustrative general configuration of a display device with exit pupil steering is illustrated in FIG. 1. A display device 130 includes a directional illuminator 100 providing an illuminating light beam 114. Herein, the term "directional illuminator" denotes an illuminator that provides a directed light beam as opposed to a diffused light beam obtained by passing a light beam through a diffuser such as milky glass, for example. The directed light beam may be a parallel light beam or a light beam with a well-defined divergence or convergence. Illustrative examples of directional illuminators will be provided further below.

A display panel 118 is disposed in an optical path downstream of the directional illuminator 100. The display panel may include an array of light valves such as a liquid crystal array, for example. The display panel 118 receives and spatially modulates the light beam 114 in amplitude and/or phase, providing a spatially modulated light beam 115 carrying an image in linear domain. Herein, the term "image in linear domain" means an image where different coordinates of light rays carrying the image correspond to different pixels of the image, as opposed to the term "image in angular domain", which means an image where different angles of light rays carrying the image correspond to the different pixels. In this context, the term "pixel" means an element of the displayed image.

A beam redirecting module 150 is disposed downstream of the display panel 118. The function of the beam redirecting module 150 is to variably redirect the spatially modulated light beam 115 to match location of an eye 134 of the user, or in some embodiments to match a specific location of a pupil 135 of the eye 134. In FIG. 1, three such locations are shown, "A", "B", and "C". The beam redirecting module 150 is capable to redirect the spatially modulated light beam 115 to any of the locations "A", "B", or "C", or any locations in between if desired. It is noted that the locations "A", "B", and "C" are generally in a three-dimensional space downstream of the beam redirecting module 150.

Figure 2:
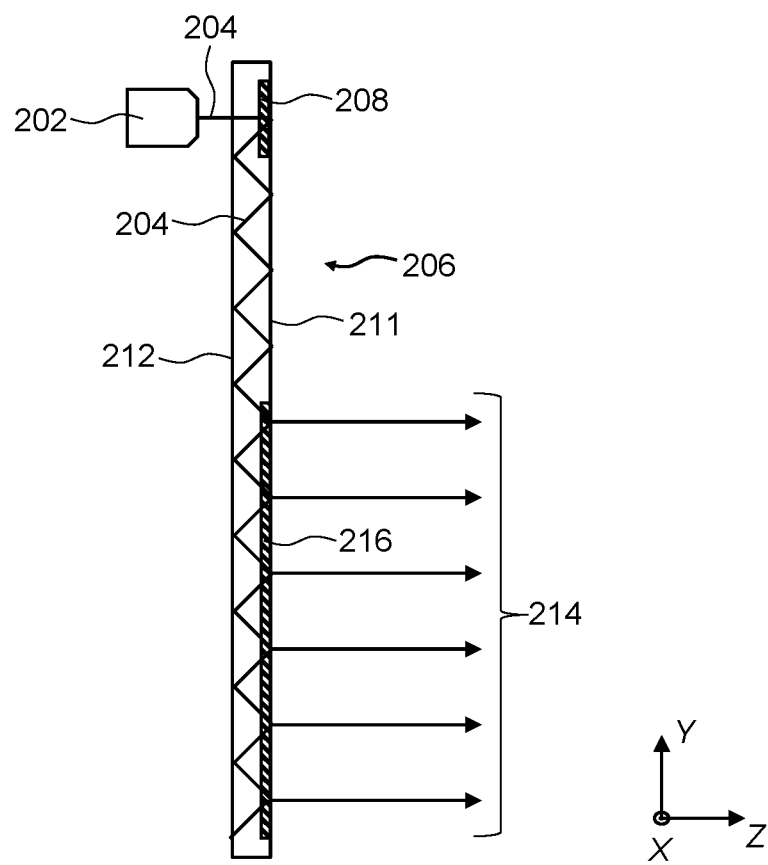
FIG. 2 is a side cross-sectional view of a directional illuminator for the display device of FIG. 1, the directional illuminator including a pupil-replicating lightguide.

Turning to FIG. 2, a multimode directional illuminator 200 may be used as the directional illuminator 100 in the display device 130 of FIG. 1. The directional illuminator 200 of FIG. 2 includes a pupil-replicating lightguide 206 configured to receive a light beam 204 from a light source 202. The pupil-replicating lightguide 206 includes opposed first 211 and second 212 surfaces running parallel to one another. The light beam 204 is in-coupled into the pupil-replicating lightguide 206 by an in-coupler 208 to propagate in the pupil-replicating lightguide 206 by a series of zigzag reflections, e.g. total internal reflections or TIRs from the opposed first 211 and second 212 surfaces, i.e. parallel to Y-axis in downward direction in FIG. 2. The output light beam of the multimode directional illuminator 200, also termed expanded light beam, includes parallel beam portions 214 offset along Y-axis, which are out-coupled from the pupil-replicating lightguide 206 by an out-coupler 216. More than one grating 216 may be provided. The in-coupler 208 and/or the out-coupler 216 may include diffraction gratings, for example. The pitch of the diffraction gratings may be selected so as to provide the required angular deflection of the light beam for the light beam in-coupling and out-coupling. The gratings may include surface relief gratings, refractive transmissive gratings, volume Bragg gratings, volume hologram gratings, polarization hologram gratings, etc. The gratings may be polarization selective to only diffract light in a particular polarization state, such as linear polarization of a certain orientation or a circular polarization of a certain handedness, for example.

Figures 3A, 3B:
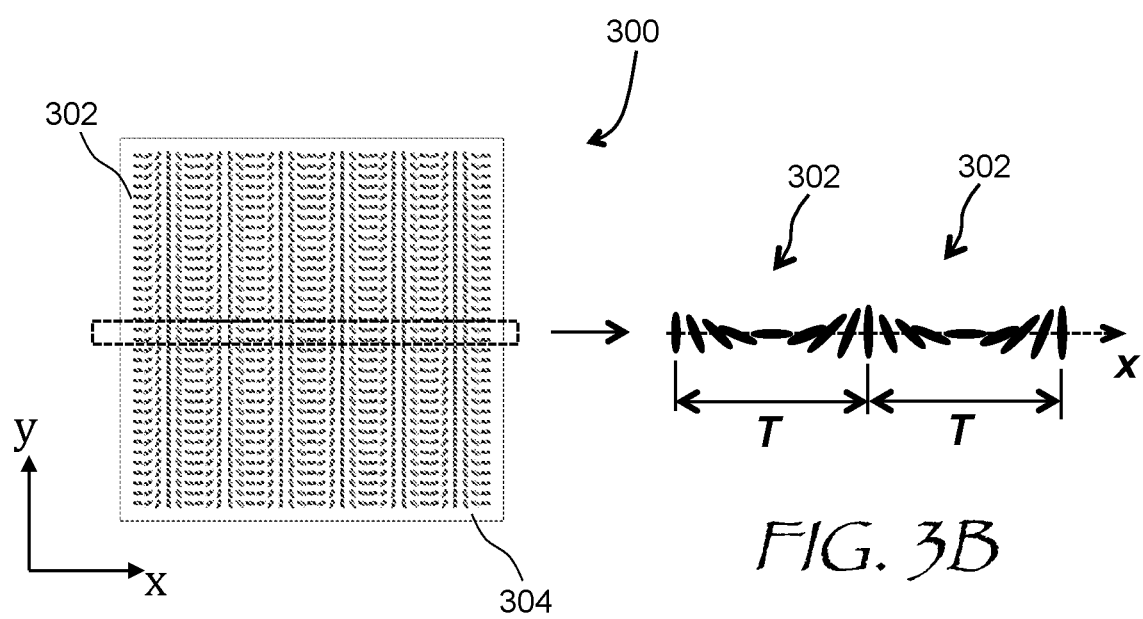
FIG. 3A is a frontal view of an active Pancharatnam-Berry phase (PBP) liquid crystal (LC) grating usable in a beam redirecting module of the display device of FIG. 1.
FIG. 3B is a magnified schematic view of LC molecules in an LC layer of the active PBP LC grating of FIG. 3A.

Referring to FIG. 3A, a Pancharatnam-Berry phase (PBP) liquid crystal (LC) switchable grating 300 may be used as a building block of the beam redirecting module 150 of the display device 130 of FIG. 1. The PBP LC switchable grating 300 includes LC molecules 302 in an LC layer 304. The LC molecules 302 are disposed in XY plane at a varying in-plane orientation depending on the X coordinate. The orientation angle $\phi(x)$ of the LC molecules 302 in the PBP LC switchable grating 300 is given by $$\phi(x) = \pi x/T = \pi x \sin\theta/\lambda_o \quad (1)$$

where $\lambda_o$ is the wavelength of impinging light, T is a pitch of the PBP LC switchable grating 300, and $\theta$ is a diffraction angle given by $$\theta = \sin^{-1}(\lambda_o/T) \quad (2)$$

The azimuthal angle $\phi$ varies continuously across the surface of an LC layer 304 parallel to XY plane as illustrated in FIG. 3B. The variation has a constant period equal to T. The optical phase delay P in the PBP LC grating 300 of FIG. 3A is due to the PBP effect, which manifests $P(x) = 2\phi(x)$ when the optical retardation R of the LC layer 304 is equal to $\lambda_o/2$.

FIGS. 4A and 4B illustrate the operation of the PBP LC switchable grating 300 of FIG. 3A. The PBP LC switchable grating 300 includes the LC layer 304 (FIG. 3A) disposed between parallel substrates configured for applying an electric field across the LC layer 304. The LC molecules 302 are oriented substantially parallel to the substrates in absence of the electric field, and substantially perpendicular to the substrates in presence of the electric field.

In FIG. 4A, of the PBP LC switchable grating 300 is in OFF state, such that its LC molecules 302 are disposed predominantly parallel to the substrate plane, that is, parallel to XY plane in FIG. 4A. When an incoming light beam 415 is left-circular polarized (LCP), the PBP LC switchable grating 300 redirects the light beam 415 upwards by a pre-determined non-zero angle, and the beam 415 becomes right-circular polarized (RCP). The RCP deflected beam 415 is shown with solid lines. When the incoming light beam 415 is right-circular polarized (RCP), the PBP LC switchable grating 300 redirects the beam 415 downwards by a pre-determined non-zero angle, and the beam 415 becomes left-circular polarized (LCP). The LCP deflected beam 415 is shown with dashed lines. Applying a voltage V to the PBP LC switchable grating 300 reorients the LC molecules along Z-axis, perpendicular to the substrate plane, as shown in FIG. 4B. At this orientation of the LC molecules 302, the PBP structure is erased, and the light beam 415 retains its original direction, whether it is LCP or RCP. Thus, the active PBP LC grating 400 has a variable beam steering property.

Figure 5:
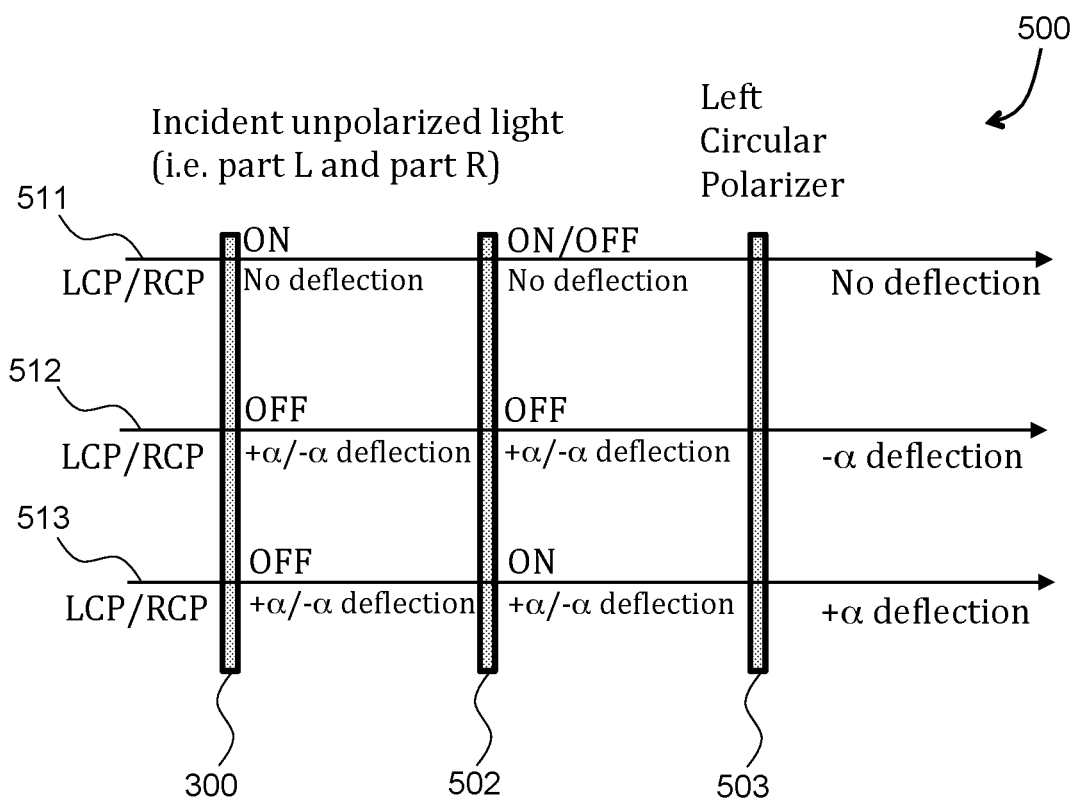
FIG. 5 is a schematic side view of an optical subassembly including the active PBP LC grating of FIG. 3A and FIGS. 4A-4B and a switchable waveplate, the stack being capable of switching an impinging light beam between three distinct directions of propagation.

In accordance with this disclosure, the above described active PBP LC gratings may be used to construct a beam deflection element switchable between three beam deflection angles. Referring to FIG. 5, a beam deflection element 500 includes the PBP LC switchable grating 300 of FIGS. 3A and 4A-4B, an LC switchable half-wave plate 502 functioning as a switchable polarization rotator, and a left-circular polarizer 503, arranged in a stack. In this example, the PBP LC switchable grating 300 includes a positive LC material, i.e. an LC material showing positive dielectric anisotropy, although a negative LC material could also be used. The input light may be not polarized, i.e. the input light may include both LCP and RCP light. When the PBP LC switchable grating 300 is in "ON" state, i.e. when the electric field is applied, the PBP structure is erased, thus the PBP LC switchable grating 300 does not deflect the light beam; as denoted at 511, no overall beam deflection occurs. When the PBP LC switchable grating 300 is in "OFF" state, i.e. when the electric field is not applied, the PBP LC orientation is present, providing the deflection of the light beam by the angle $\alpha$ for LCP light and $-\alpha$ for RCP light. When the switchable half-wave waveplate 502 is in OFF state, i.e. when the electric field is not applied, the half-wave retardation is present, as denoted at 512. As a result, the RCP light at the deflection angle $-\alpha$ becomes LCP light, which is passed through the left-circular polarizer 503. Thus, the beam deflection element 500 deflects the light beam by the angle of $-\alpha$. When the switchable half-wave waveplate 502 is in ON state, i.e. when the electric field is applied, the half-wave retardation is erased, and the LCP light remains L-polarized, as denoted at 513. Thus, the beam deflection element 500 deflects the light beam by the angle $\alpha$.

Figure 6:
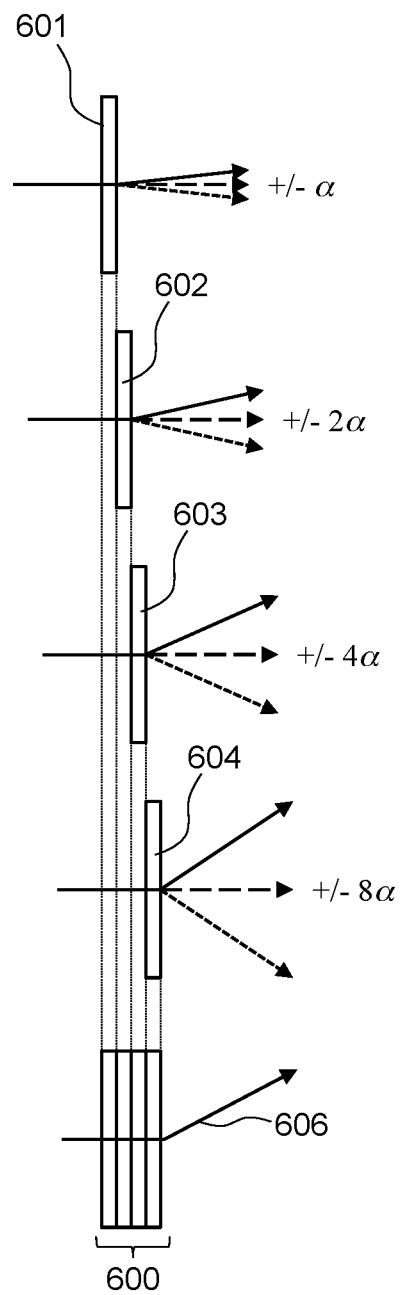
FIG. 6 is an exploded view of an embodiment of the beam redirecting module of FIG. 1 including a binary stack of the optical subassemblies of FIG. 5.

In accordance with an aspect of this disclosure, the beam redirecting module 150 of the display device 130 of FIG. 1 may include a stack of the beam deflection elements 500 of FIG. 5 with different magnitudes of deflection. The magnitudes of deflection may be in a binary relationship to one another. Referring to FIG. 6 for a non-limiting illustrative example, a binary stack 600 of switchable deflection elements includes a first switchable deflection element 601 providing switchable deflection between angles of $-\alpha$, 0, $+\alpha$; a second switchable deflection element 602 providing switchable deflection between angles of $-2\alpha$, 0, $+2\alpha$; a third switchable deflection element 603 providing switchable deflection between angles of $-4\alpha$, 0, $+4\alpha$, and a fourth switchable deflection element 604 providing switchable deflection between angles of $-8\alpha$, 0, $+8\alpha$. Together, the switchable deflection elements 601-604 of the stack 600 may deviate a light beam 606 by an angular range from $-15\alpha$ to $15\alpha$ by switching ON and OFF corresponding PBP LC gratings and waveplates.

PBP LC devices may exhibit a wavelength dependence of performance. It follows from Eqs. (1) and (2) that a PBP LC grating having an LC director profile $\phi(r)$ will exhibit a deflecting angle θ directly proportional to wavelength $\lambda_0$. If such a grating were used to redirect light of a color display, which typically has three primary color channels, only one color channel would be redirected properly.

Figure 7A:
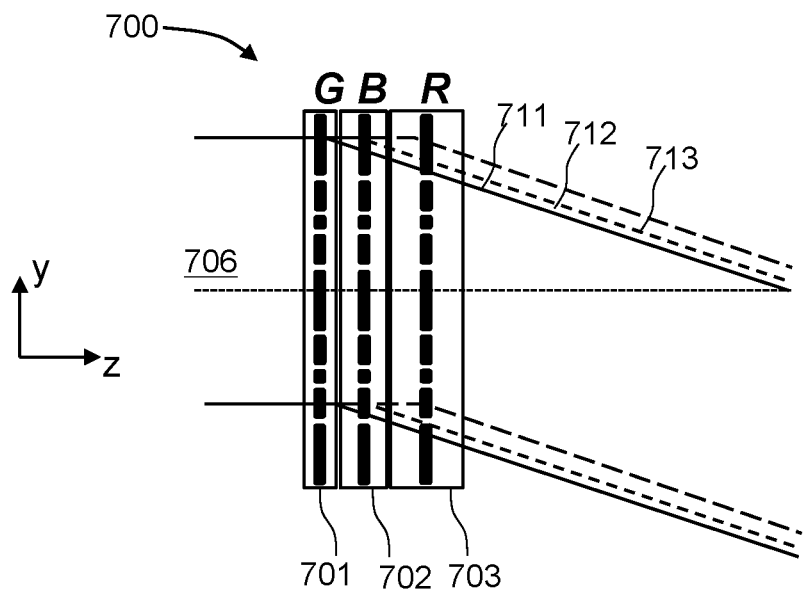
FIGS. 7A and 7B are schematic side views of a polychromatic switchable PBP LC grating assembly in a diffracting state (FIG. 7A) and a non-diffracting state (FIG. 7B)

To make sure that all three color channels are redirected correctly, a stack of three PBP LC gratings may be used, one for each color channel. By way of a non-limiting example, referring to FIG. 7A, a switchable PBP LC device 700 is a combination of three switchable PBP LC stacks 600 of FIG. 6: G stack 701 for green color, B stack 702 for blue color, and R stack 703 for red color. In FIG. 7A, a green beam component 711 (solid lines) of a beam 706 is redirected by the G stack 701 only; a blue beam component 712 (short-dash lines) is focused by the B stack 702 only; and a red beam component 713 (long-dash lines) is focused by the R stack 703 only. To provide zero optical power at wavelengths of the other color channels, the R, G, B PBP LC grating and waveplate thicknesses are selected such that their optical retardation at both other wavelengths is integer number of waves, or even number of half wavelengths, resulting in zero PBP and no LCP/RCP polarization transformation and, accordingly, zero deflection angle at the other two color channels. To provide the beam deflecting power at the R, G, B channel wavelengths, the R, G, B PBP LC grating and waveplate thicknesses are selected such that their optical retardation at their own wavelengths is an odd number of half wavelengths, resulting in a non-zero PBP and LCP/RCP polarization transformation and, accordingly, a non-zero optical power of the R, G, B gratings. This technique may be used to make the PBP LC gratings operate with at least two channels. For two color channels, the PBP LC switchable gratings may include first and second PBP LC switchable gratings. The first PBP LC switchable grating may include a first LC layer having a first optical retardation substantially equal to: an odd number of half wavelengths of the first color channel; and an even number of half wavelengths of the second color channel. The second PBP LC switchable grating may include a second LC layer having a second optical retardation substantially equal to: an odd number of half wavelengths of the second color channel; and an even number of half wavelengths of the first color channel. In a similar manner, for three color channels, the PBP LC switchable gratings may further include a third PBP LC switchable grating having a third LC layer having a third optical retardation substantially equal to: an odd number of half wavelengths of the third color channel; and an even number of half wavelengths of the first and second color channels.

Figure 7B:
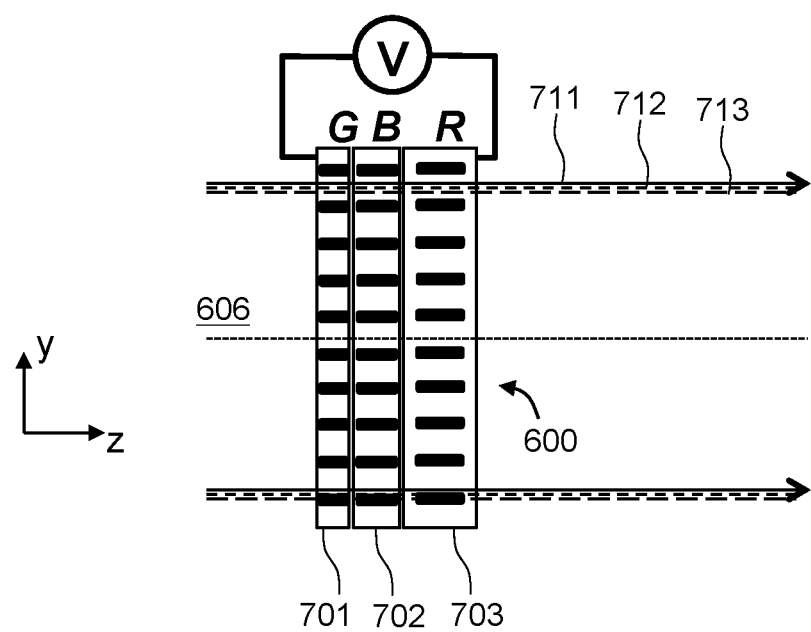

Referring to FIG. 7B, all three stacks 701-603 are in "ON" state, and as a result, the beam deflecting power of the switchable LC PBP device 700 is zero, i.e. the beam 706 retains original direction of propagation. It is to be noted that, even though one voltage V is shown to be applied to the stack of the PBP LC stacks 701-603 for simplicity, in actual implementation different sets of voltages are typically applied to different PBP LC stacks 701-703. It is also to be understood that the term "achromatic" is used herein to indicate a reduced dependence of performance of PBP LC devices on wavelength, and the achromaticity may be incomplete due to intra-channel wavelength dependence of optical retardation.

The above examples of PBP LC switchable gratings considered the light beam deflection only in one plane. To achieve a light beam deflection in two orthogonal planes, two PBP LC gratings, or two stacks of such gratings may be disposed at 90 degrees clocking angle w.r.t. each other. For example, for each PBP LC switchable grating 300 (FIG. 3A) with the azimuthal angle $\phi_1$ varying along X-axis, $\phi_1 = \phi(x)$, the stack may include a PBP LC switchable grating 300 with the azimuthal angle $\phi_2$ varying along Y-axis, $\phi_2 = \phi(y)$.

Figure 8:
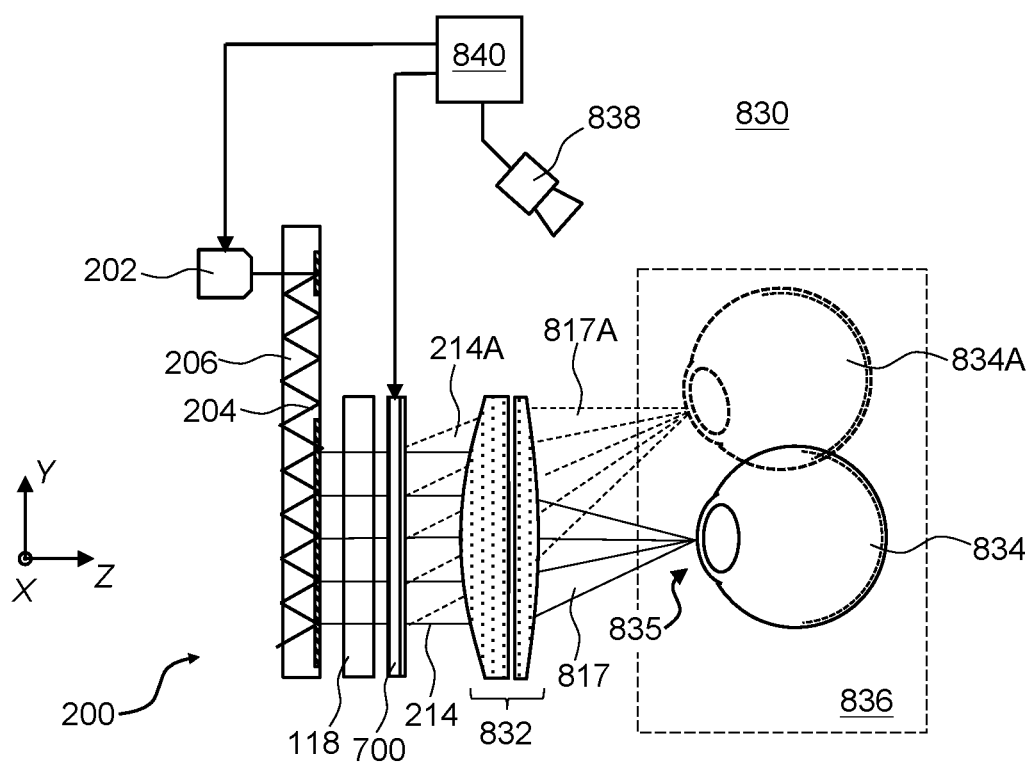
FIG. 8 is a schematic view of a near-eye display device of this disclosure with a transmissive display panel.

Referring to FIG. 8, a transmissive near-eye display (NED) device 830 is a an embodiment of the display device 130 of FIG. 1. The transmissive NED 830 of FIG. 8 uses the transmissive display panel 118, the multimode directional illuminator 200 of FIG. 2, and the achromatic switchable PBP LC device 700 of FIGS. 7A and 7B as the beam redirecting device. Other types of directional illuminators and beam redirecting devices may be used as well. The display device 830 also includes an ocular lens 832 and an eye-tracking system 838.

The directional illuminator 200 illuminates the display panel 118 with the light beam portions 214 obtained from the light beam 204 emitted by the light source 202 and coupled into the pupil-replicating lightguide 206, which outputs the light beam portions 214 as explained above. An ocular lens 832 is coupled to the display panel 118 for converting an image in linear domain displayed by the display panel 118 into an image in angular domain for observation by a user's eye 834 placed at an eyebox 836. The display panel 118 operates in transmission in this example.

An eye tracking system 838 is configured to determine a position/orientation of the eye 834, and/or the position of the pupil 835 of the eye 834. A controller 840 is operably coupled to the switchable PBP LC device 700 and the eye tracking system 838 and configured to tune the out-coupling angle of light beam portions 214 for a converging beam 817 focused by the ocular lens 832 to match the eye pupil 835 position. For example, when the eye 834 shifts to a new position shown with dashed lines at 834A, the eye tracking system 838 determines the new position, reports the new position to the controller 840, which then tunes the switchable PBP LC device 700 to provide deflected light beam portions 214A that are focused by the ocular lens 832 to provide a focused beam 817A converging on the new position 834A. Such a configuration enables the NED 830 to only send image light where the eye pupils are located, providing power savings and/or increasing perceived brightness of the observed image. In other words, the NED 830 enables steering of the exit pupil of the display to match the current eye pupil position.

Figure 9:
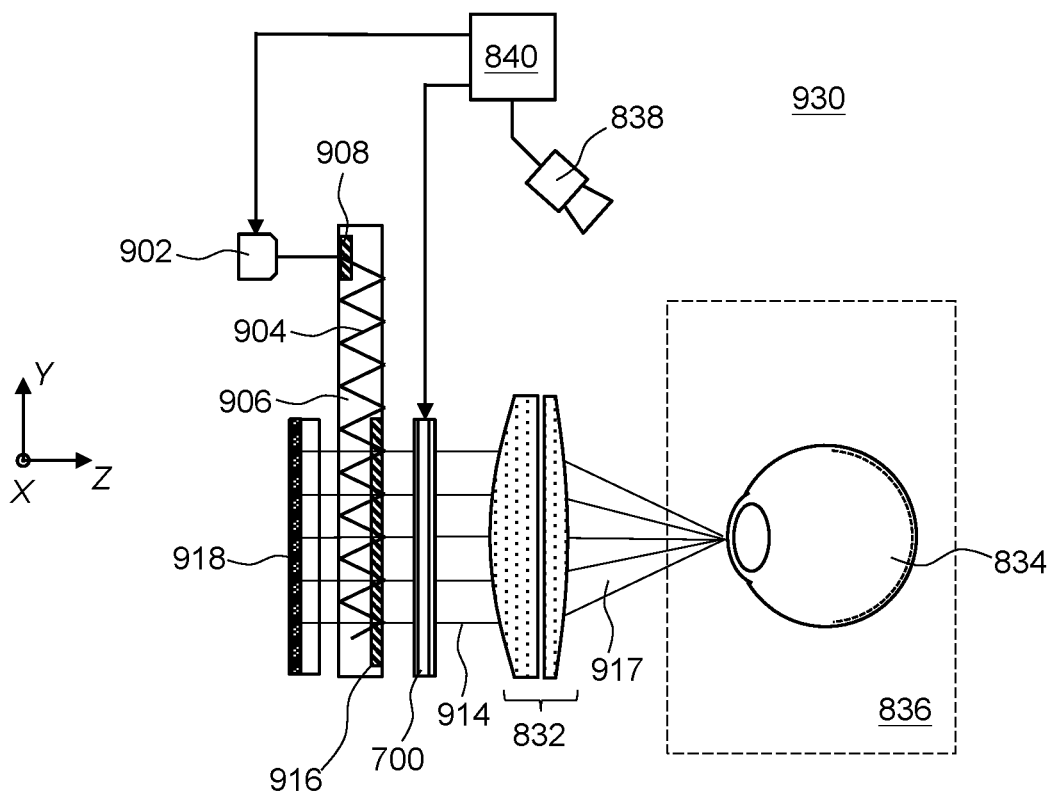
FIG. 9 is a schematic view of a near-eye display device of this disclosure with a reflective display panel.

A reflective configuration of a display device is possible with a reflective display panel such as, for example, a reflective liquid crystal on silicon (LCoS) display panel. LCoS display panels combine a possibility of miniaturization with the convenience of disposing the driving circuitry on the reflective silicon substrate of the LC array. Referring to FIG. 9, a reflective NED 930 is similar to the transmissive NED 830 of FIG. 8, but uses a polarized light source 902 and a reflective display panel 918 instead of the transmissive display panel 118. The reflective NED 930 includes a pupil-replicating lightguide 906 having an in-coupling grating 908 and an out-coupling polarization-selective grating 916. A polarized light beam 904 emitted by the polarized light source 902 is coupled into the pupil-replicating lightguide 906 by the in-coupling grating 908, out-coupled by the out-coupling polarization-selective grating 916 as polarized light beam portions 914. The polarized light beam portions 914 are directed to the reflective display panel 918, propagate back through the pupil-replicating lightguide 906, through the switchable PBP LC device 700, and towards the ocular lens 832, forming a converging beam 917 at the eyebox 836.

Figure 10:
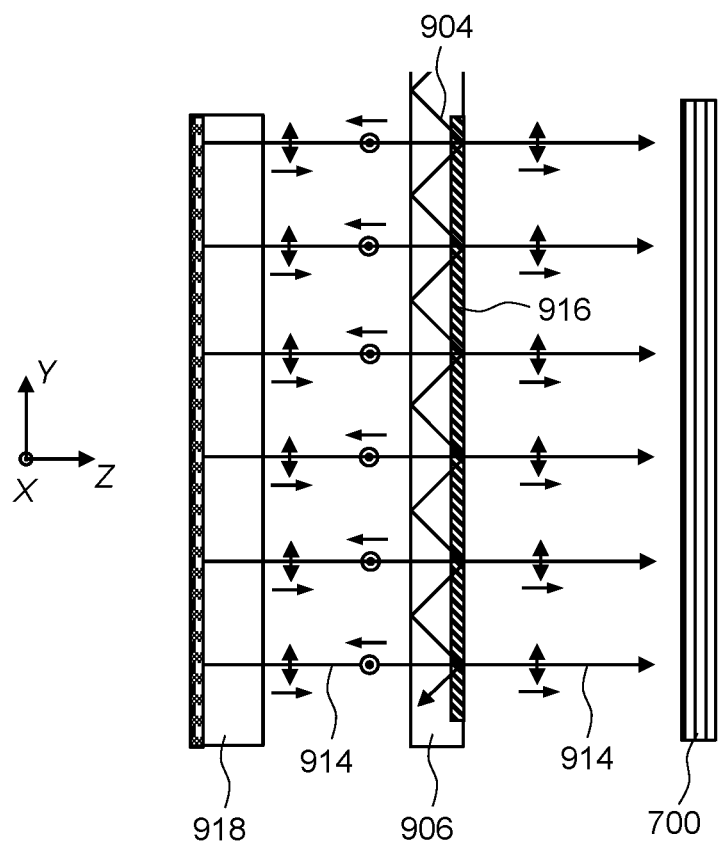
FIG. 10 is a magnified view of the near-eye display device of FIG. 9 showing propagation of polarized light beams.

The propagation of the light beam portions 914 is illustrated more precisely in FIG. 10. The polarized portions 914 of the light beam 904 guided by the pupil-replicating lightguide 906 are out-coupled by the polarization-selective grating 916 at a linear polarization perpendicular to the plane of FIG. 10, i.e. parallel to X-axis. The polarized light beam portions 914 propagate towards the reflective display panel 918, e.g. an LCoS reflective display panel, which reflects the light beam portions 914 to propagate back towards the pupil-replicating lightguide 906 with a spatially variant polarization state. The light beam portions 914 at a linear polarization state in plane of FIG. 10, that is, parallel to Y-axis, propagate freely through the polarization-selective grating 916, while the light beam portions 914 at the initial polarization state, that is, perpendicular to the plane of FIG. 5 or parallel to X-axis, are deviated (diffracted) by the polarization-selective grating 916 away from the optical path. As a result, the polarized beam portions 914 propagated through the polarization-selective grating 916 (from left to right in FIG. 5, i.e. in the direction of Z-axis) are modulated in amplitude providing an image in linear domain. The beam portions 914 can then be redirected by the switchable PBP LC device 700 or, more generally, the beam redirecting module 150.

Figure 11:
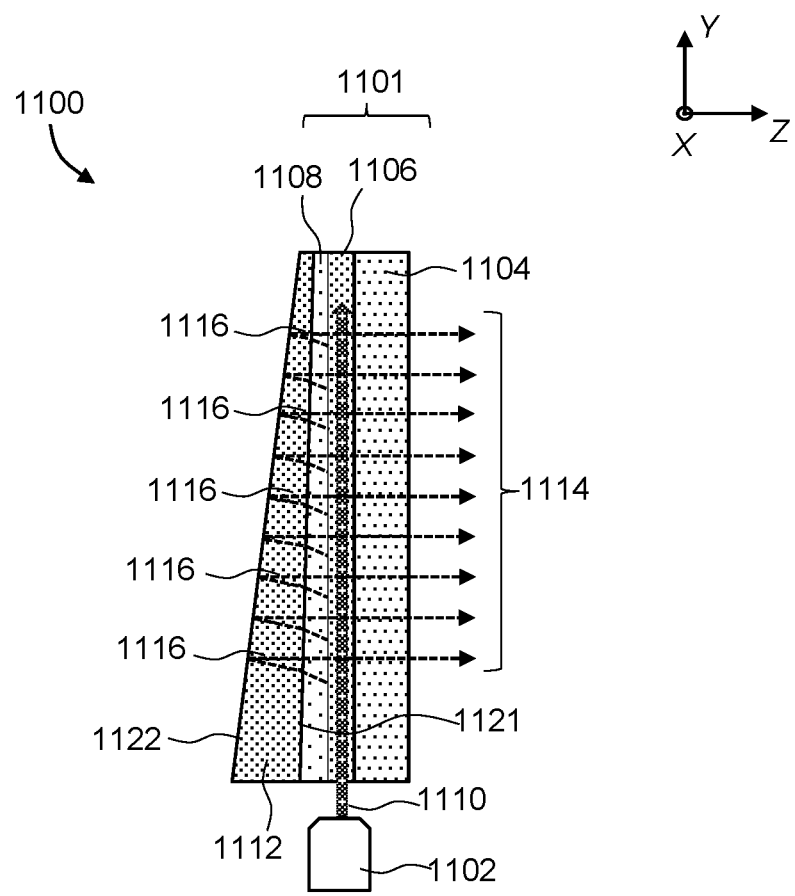
FIG. 11 is a side cross-sectional view of a directional illuminator for the display device of FIG. 1, the directional illuminator including a slab singlemode or a few-mode waveguide.

Referring now to FIG. 11, a singlemode directional illuminator 1100 can be used as the directional illuminator 100 of the display device 130 of FIG. 1 or, for example, instead of the directional illuminator 200 of the display device 830 of FIG. 8. The singlemode directional illuminator 1100 includes a slab waveguide 1101, typically a singlemode or a few-mode slab waveguide, and a light source 1102 providing a light beam 1110, which is in-coupled into the slab waveguide 1101 using a suitable coupler, e.g. a lens-based coupler, not shown. The slab waveguide 1101 includes a substrate 1104, a (slab) core layer 1106 on the substrate 1104, and a cladding layer 1108 over the core layer 1106. Thickness of the cladding layer 1108 may change, i.e. may vary spatially, in a direction of the light 1110 propagation in the core layer 1106, that is, along Y-axis in FIG. 11. The light 1110 propagates in Y-direction in FIG. 11, and the thickness (measured in Z-direction) gradually decreases in going along the Y-direction, i.e. bottom to top in FIG. 11.

A light extractor 1112, e.g. a thin prism, is disposed on the top cladding layer 1108. The light extractor 11212 has a refractive index $n_{ext}$ higher than an effective refractive index $n_{eff}$ of a mode of propagation of the light 1110 in the slab waveguide 1101, and the cladding layer 1108 is thin enough for evanescent out-coupling of the light 1110 from the core layer 1106 into the light extractor 1112. By way of illustration, the thickness of the cladding layer 1108 may be between 0.3 and 3 micrometers, or even between 0.1 micrometer and 5 micrometers in some embodiments.

In operation, the light 1110 propagates in the core layer 1106 in Y-direction, as shown with a gray arrow. Portions 1116 of the light 1110 are out-coupled into the light extractor 1112 as the light 1110 propagates in the core layer 1106. Angle θ (relative to the waveguide normal) at which the portions 1116 are out-coupled depends only on the ratio of the effective refractive index $n_{eff}$ of the waveguide mode to the refractive index $n_{ext}$ of the extractor 1112:

$$\theta = a\ \sin(n_{eff}/n_{ext}) \quad (3)$$

Eq. (3) follows from the law of momentum conversion applied to light. The rate of light tunneling is controlled by the thickness of the cladding layer 1108.

The thickness of the cladding layer 1108 may decrease in the direction of the light 1110 propagation (i.e. along Y-axis), so as to offset depleting optical power level of the light 1110 as portions 1116 are evanescently out-coupled, and thereby increase spatial uniformity of collimated light 1114 out-coupled from the core layer 1106 through the top cladding layer 1108 and into the light extractor 1112. The wedging may be achieved, by low-resolution greytone etching techniques. There may be an AR coating between the cladding layer 1108 and the light extractor 1112. The AR coating may be applied to either top of the cladding 1108, the bottom of the light extractor 1112, or both, depending on the refractive index of the light extractor 1112, the cladding layer 1108, and the bonding material used.

In the embodiment shown, the light extractor 1112 is a thin prism, e.g. thinner than 1 mm, having first 1121 and second 1122 faces forming a small acute angle. The second face 1122 may include a reflector, e.g. metal or dielectric reflector, for reflecting the light portions 1116 out-coupled by the prism to propagate back through the slab waveguide 1101 at an angle close to normal angle. For example, for 0.95 mm tall light extractor 212, the angle may be about 26 degrees; it may be as low as within 15 degrees of the normal angle for some materials. The reflector at the second face 1122 may be polarization-selective in some embodiments. In applications where a wider beam is needed, a thicker prism may be used. The prism's height may still remain less than one half of the beam diameter in that case. The second face 1122 may be polished to a radius of curvature, so that the reflector has an optical (i.e. focusing or defocusing) power. It is noted that the term "prism", as used herein, includes prisms with curved outer faces.

Figure 12:
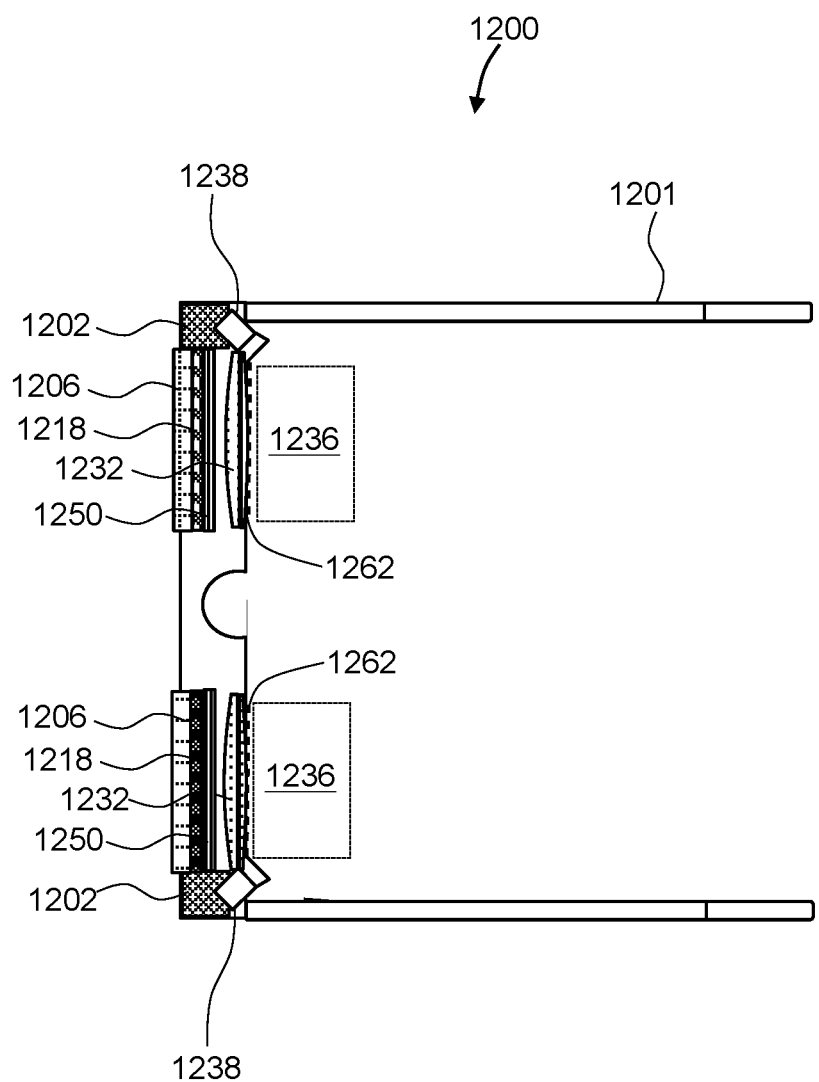
FIG. 12 is a view of near-eye display of this disclosure, the display having the form factor of a pair of eyeglasses.

Turning to FIG. 12, an augmented reality (AR) near-eye display 1200 includes a frame 1201 supporting, for each eye: a light source 1202; a pupil-replicating lightguide 1206 for guiding the light beam inside and out-coupling portions of the light beam as disclosed herein; a display panel 1218 illuminated by the light beam portions out-coupled from the pupil-replicating lightguide 1206 for spatially modulating the light beam portions; a beam redirecting module 1250 for redirecting the spatially modulated beam portions; an ocular lens 1232 for converting an image in linear domain displayed by the display panel 1218 into an image in angular domain at an eyebox 1236 as disclosed herein; an eye-tracking camera 1238; and a plurality of eyebox illuminators 1262, shown as black dots. The eyebox illuminators 1262 may be supported by ocular lens 1232 for illuminating an eyebox 1236.

The purpose of the eye-tracking cameras 1238 is to determine position and/or orientation of both eyes of the user to enable steering the output image light to the locations of the user's eyes as disclosed herein. The illuminators 1262 illuminate the eyes at the corresponding eyeboxes 1236, to enable the eye-tracking cameras 1238 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1262, the light illuminating the eyeboxes 1236 may be made invisible to the user. For example, infrared light may be used to illuminate the eyeboxes 1236.

Figure 13:
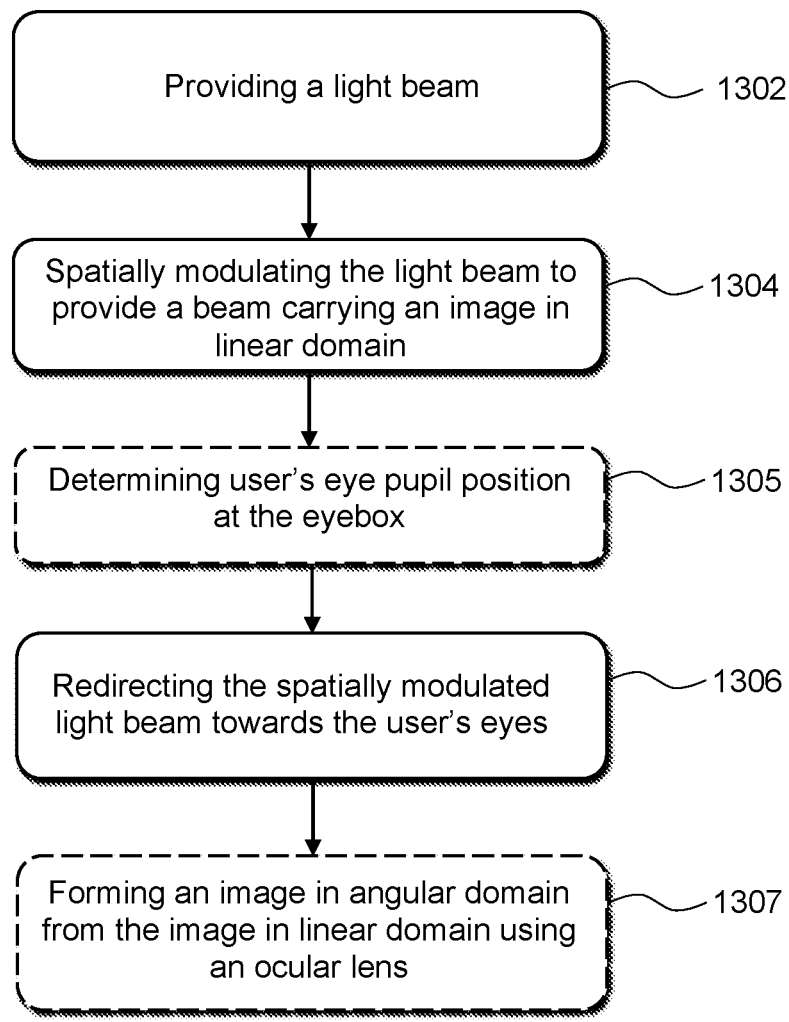
FIG. 13 is a flow chart of a method of this disclosure for displaying an image to a user.

Referring now to FIG. 13 with further reference to FIGS. 1, 2, and 8, a method 1300 for displaying an image to a user includes providing (1302) a light beam, e.g. the light beam 204 emitted by the light source 202 (FIG. 2), receiving and spatially modulating (FIG. 13; 1304) the light beam to provide a spatially modulated light beam (e.g. the modulated light beam 115 in FIG. 1) carrying an image in linear domain, and using a beam redirecting module such as the beam redirecting module 150 or the switchable PBP LC device 700, to variably redirect (FIG. 13; 1306) the spatially modulated light beam towards an eye of the user.

The method 300 may further include forming (1307), by an ocular lens such as the ocular lens 832 shown in FIG. 8, an image in angular domain from the image in linear domain carried by the spatially modulated light beam and redirected by the beam redirecting module. Further optional steps of the method 300 may include determining (1305) a user's eye pupil position in the eyebox before the redirection (1306) of the spatially modulated light beam to match the eye pupil position in the eyebox. Using the beam redirecting module may include switching at least one switchable grating (e.g. the PBP LC grating 300 of FIG. 3) of a stack of switchable gratings (e.g. the stack 600 of FIG. 6).

Figure 14:
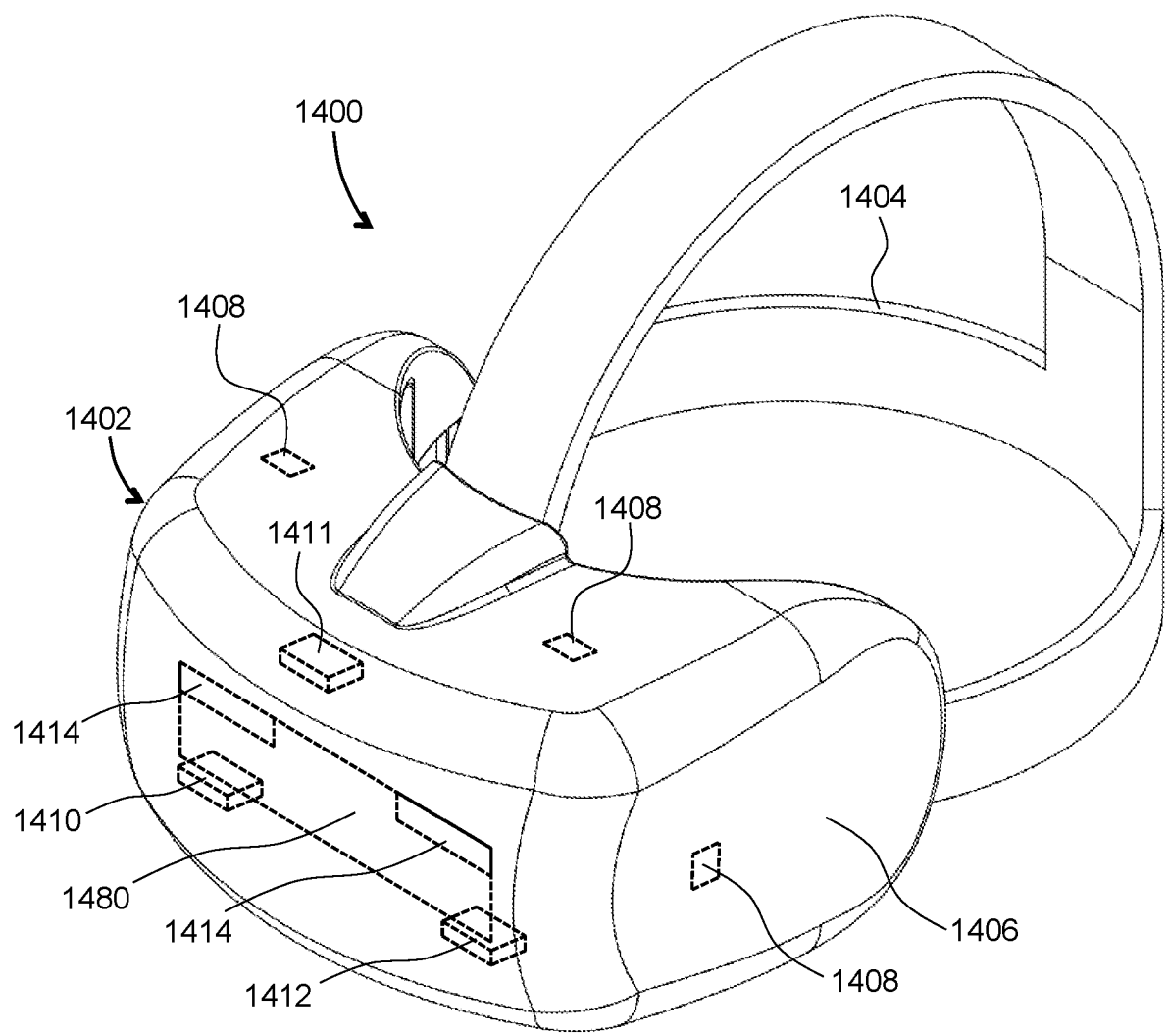
FIG. 14 is a three-dimensional view of a head-mounted display of this disclosure.

Turning to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and illuminators disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
a directional illuminator for providing a light beam;
a display panel downstream of the directional illuminator, for receiving and spatially modulating the light beam to provide a spatially modulated light beam carrying an image in linear domain;
a beam redirecting module downstream of the display panel, for variably redirecting the spatially modulated light beam; and
an ocular lens downstream of the beam redirecting module, for forming an image in angular domain at an eyebox of the display device from the image in linear domain carried by the spatially modulated light beam and redirected by the beam redirecting module.

2. The display device of claim 1, further comprising:
an eye tracking system for determining a pupil position of a user's eye in the eyebox; and
a controller operably coupled to the eye tracking system and the beam redirecting module and configured to cause the beam redirecting module to redirect the spatially modulated light beam to match the eye pupil position in the eyebox.

3. The display device of claim 1, wherein the directional illuminator comprises a slab singlemode or a few-mode waveguide.

4. The display device of claim 1, wherein the directional illuminator comprises a pupil-replicating lightguide.

5. The display device of claim 1, wherein the beam redirecting module comprises a stack of switchable gratings.

6. The display device of claim 5, wherein each switchable grating of the stack is configured to redirect the spatially modulated light beam by a zero angle in a first state and a pre-determined non-zero angle in a second state, wherein the pre-determined non-zero angles of different switchable gratings of the stack are in a binary relationship to one another.

7. The display device of claim 5, wherein the stack of switchable gratings comprises a Pancharatnam-Berry phase (PBP) liquid crystal (LC) switchable grating.

8. The display device of claim 7, wherein the stack of switchable gratings further comprises a switchable polarization rotator disposed downstream of the PBP LC switchable grating, and a circular polarizer disposed downstream of the switchable polarization rotator.

9. The display device of claim 7, wherein:
the directional illuminator is configured for providing the light beam comprising light at first and second color channels;
the PBP LC switchable gratings comprise first and second PBP LC switchable gratings;
the first PBP LC switchable grating comprises a first LC layer having a first optical retardation substantially equal to: an odd number of half wavelengths of the first color channel;
and an even number of half wavelengths of the second color channel; and
the second PBP LC switchable grating comprises a second LC layer having a second optical retardation substantially equal to: an odd number of half wavelengths of the second color channel; and an even number of half wavelengths of the first color channel.

10. The display device of claim 9, wherein:
the directional illuminator is further configured for providing the light beam comprising light at a third color channel; and
the PBP LC switchable gratings further comprise a third PBP LC switchable grating comprising a third LC layer having a third optical retardation substantially equal to: an odd number of half wavelengths of the third color channel; and an even number of half wavelengths of the first and second color channels.

11. A display device comprising:
a light source for providing a light beam;
a pupil-replicating lightguide downstream of the light source, for expanding the light beam to provide an expanded light beam;
a display panel downstream of the pupil-replicating lightguide, for receiving and spatially modulating the expanded light beam to provide a spatially modulated light beam carrying an image in linear domain;
a beam redirecting module downstream of the display panel, for variably redirecting the spatially modulated light beam; and
an ocular lens downstream of the beam redirecting module, for forming an image in angular domain at an eyebox of the display device from the image in linear domain carried by the spatially modulated light beam.

12. The display device of claim 11, further comprising:
an eye tracking system for determining a display user's eye pupil position in the eyebox; and
a controller operably coupled to the eye tracking system and the beam redirecting module and configured to cause the beam redirecting module to redirect the spatially modulated light beam to match the eye pupil position in the eyebox.

13. The display device of claim 11, wherein the beam redirecting module comprises a stack of switchable gratings.

14. The display device of claim 13, wherein the stack of switchable gratings comprises Pancharatnam-Berry phase (PBP) liquid crystal (LC) switchable gratings.

15. The display device of claim 14, wherein PBP LC switchable gratings comprise an LC layer between parallel substrates configured for applying an electric field across the LC layer, wherein LC molecules of the LC layer are oriented substantially parallel to the substrates in absence of the electric field, and substantially perpendicular to the substrates in presence of the electric field.

16. A method for displaying an image to a user, the method comprising:
providing a light beam;
receiving and spatially modulating the light beam to provide a spatially modulated light beam carrying an image in linear domain;
using a beam redirecting module to variably redirect the spatially modulated light beam towards an eye of the user; and
forming, by an ocular lens, an image in angular domain from the image in linear domain carried by the spatially modulated light beam and redirected by the beam redirecting module.

17. The method of claim 16, further comprising:
determining a display user's eye pupil position in an eyebox; and
causing the beam redirecting module to redirect the spatially modulated light beam to match the eye pupil position in the eyebox.

18. The method of claim 16, wherein using the beam redirecting module comprises switching at least one switchable grating of a stack of switchable gratings.

* * * * *